Feb. 19, 1935. G. J. THOMAS 1,991,525
BRAKE
Filed July 3, 1929 3 Sheets-Sheet 1
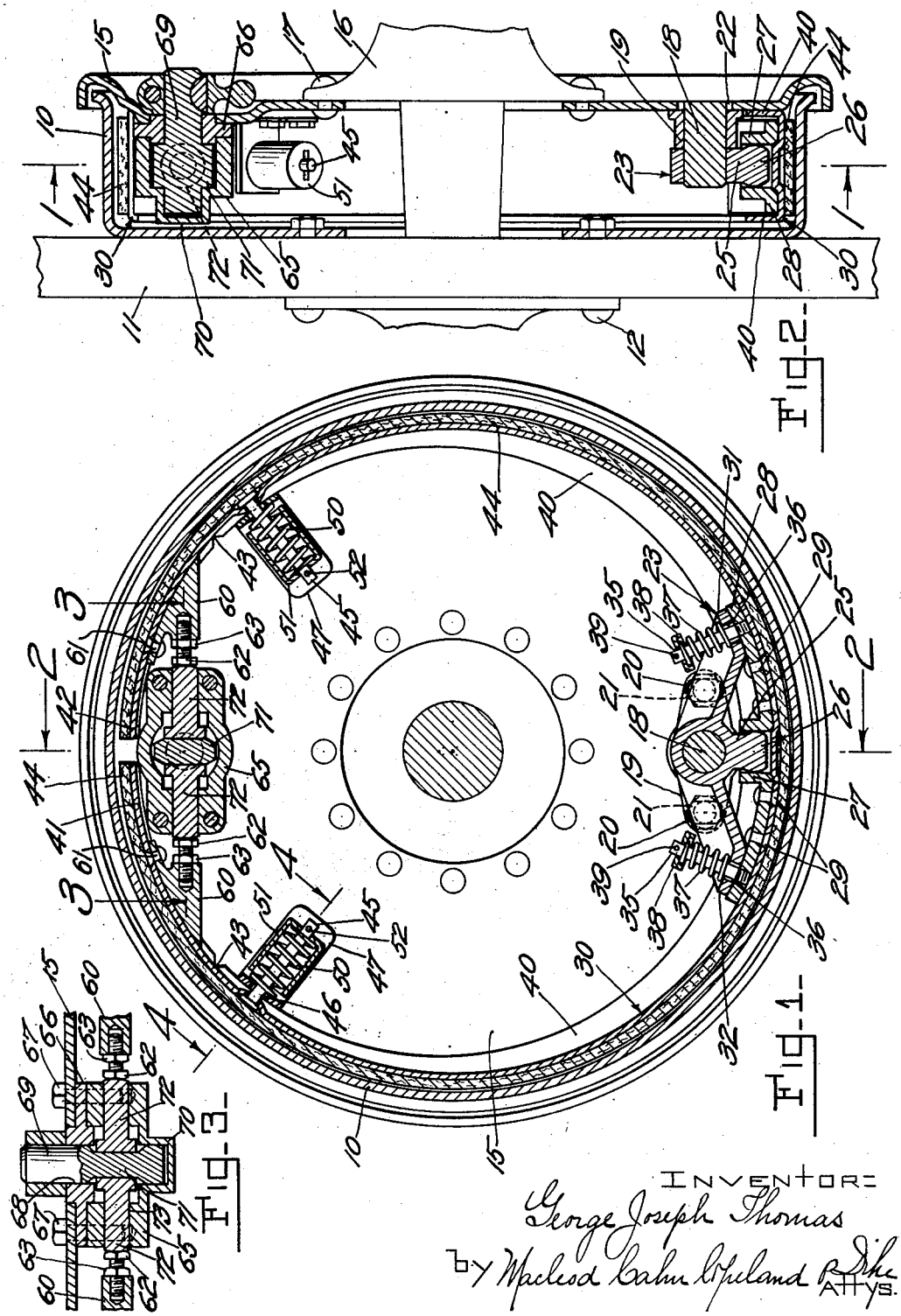

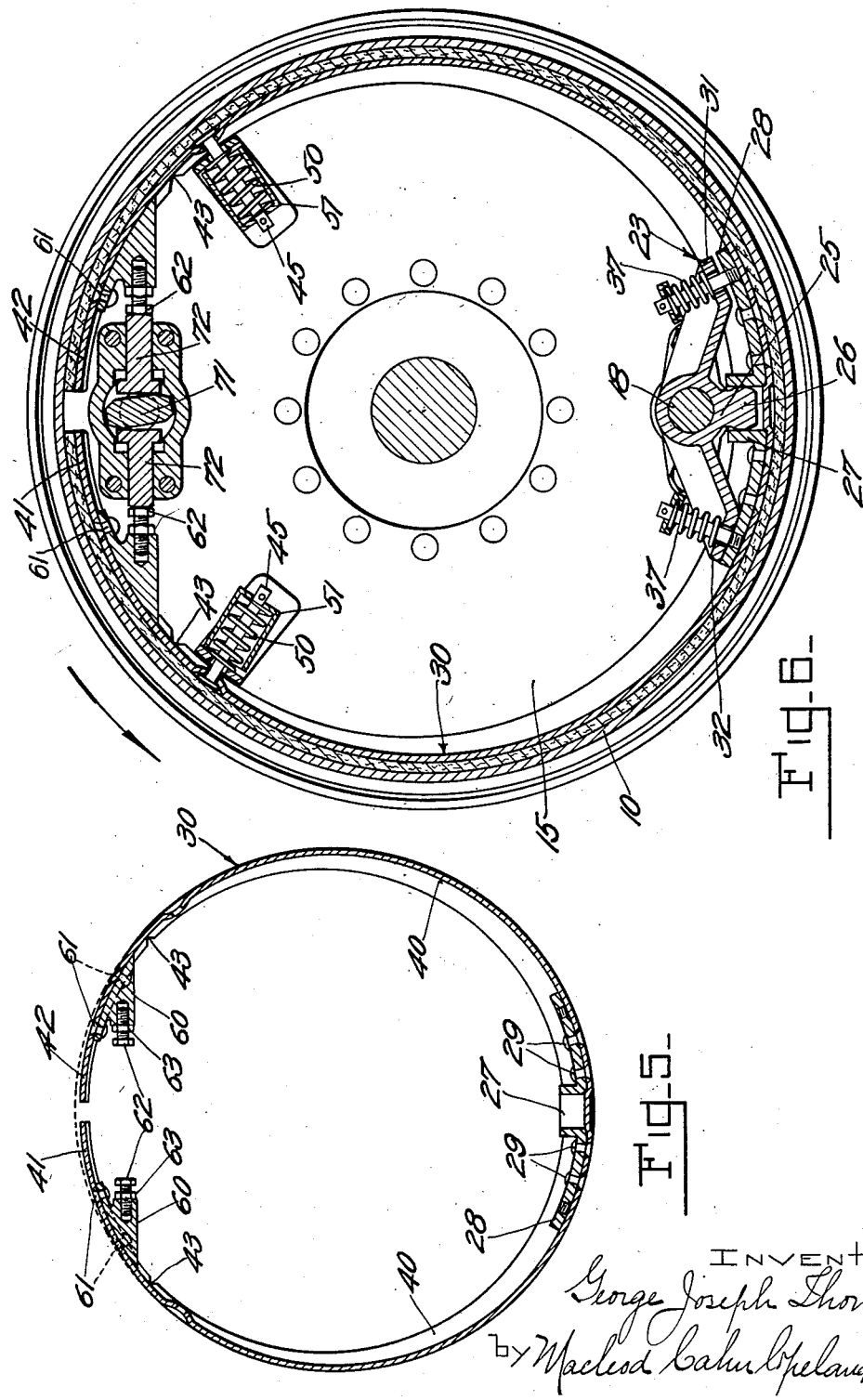

Feb. 19, 1935.  G. J. THOMAS  1,991,525
BRAKE
Filed July 3, 1929  3 Sheets-Sheet 3
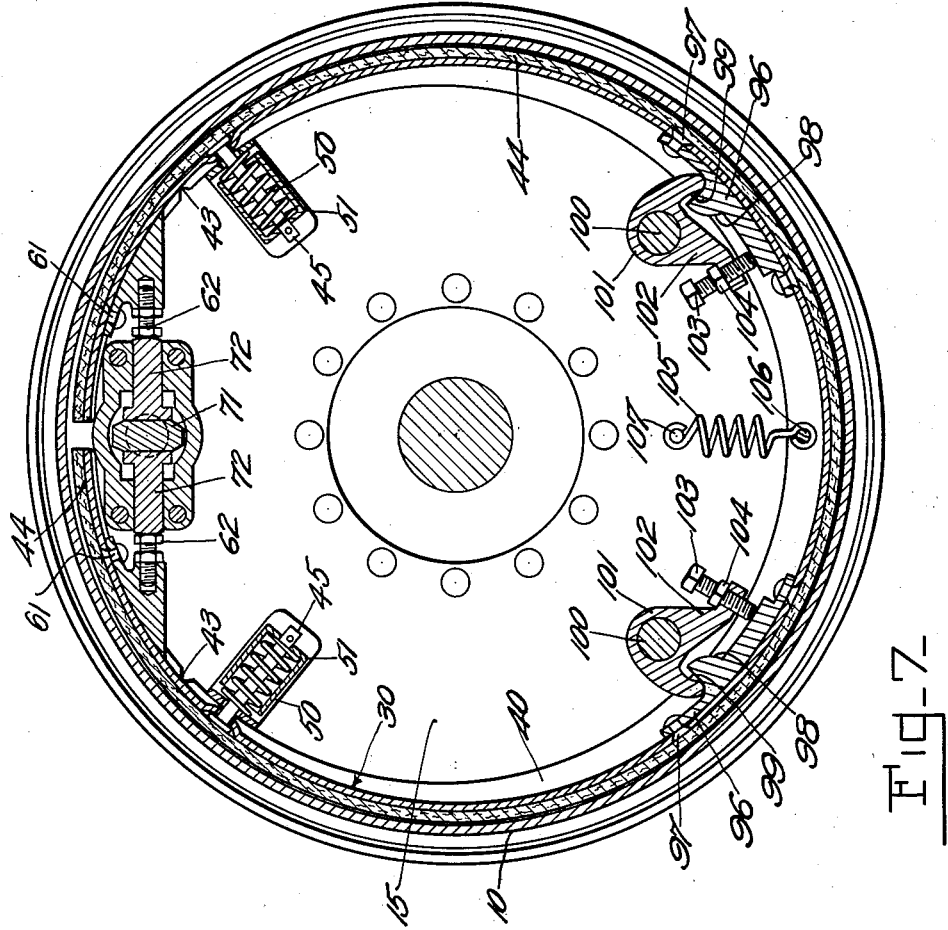
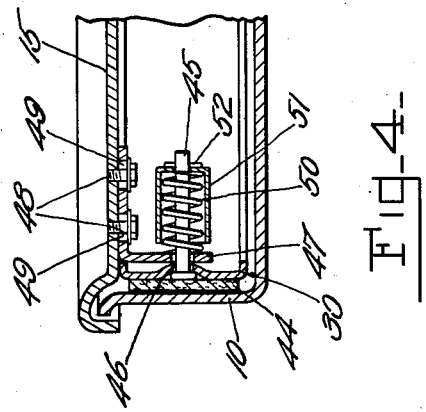
INVENTOR:
George Joseph Thomas
by Macleod Cahn Copeland Dike
Attys.

Patented Feb. 19, 1935

1,991,525

UNITED STATES PATENT OFFICE 1,991,525

BRAKE

George Joseph Thomas, South Bend, Ind.

Application July 3, 1929, Serial No. 375,752

12 Claims. (Cl. 188—78)

This invention relates to vehicle brakes and particularly to brakes of the internal expanding type.

Brakes of this general type commonly comprise a drum which is fixed upon the vehicle wheel so as to rotate therewith. The drum is enclosed by a backing plate secured upon the axle housing. A split circular shoe of substantially the curvature of the drum and having a brake lining or similar material attached thereto is pivotally mounted on a suitable anchor pin on the backing plate intermediate the ends of the shoe. A cam actuated by the brake pedal is interposed between the free ends of the shoe and is adapted to engage opposite ends of the shoe to spread the ends apart to bring the shoe into engagement with the drum when the brakes are applied.

In brakes of this general type as constructed heretofore the force of the cam upon opposite ends of the shoe was not transmitted so as to urge the shoe against the drum with a uniform pressure throughout all possible points of engagement but on the contrary the pressure was centralized upon a relatively small portion of the adjacent surfaces of the brake shoe and drum. On account of the fact that the pressure of the shoe upon the drum was localized an extra heavy pressure of the cam was required to bring about the desired braking action and as a result the brakes would squeal.

This unequal distribution of the pressure of the shoe upon the drum was due in part to the fact that the cam for applying the pressure engaged directly with the ends of the shoe at different distances from the anchor pin for the shoe and as a result the moment of the forces applied to opposite ends of the shoe was different. Furthermore, inasmuch as the cam engaged one end of the shoe near the top thereof and the other end near the bottom thereof there was a tendency to move the former end inward and the latter end outward.

There was also a considerable tendency for the interengaging surfaces of the cam and the ends of the shoe to wear due to the presence of dirt. This resulted in the formation of notches in the opposite ends of the shoe increasing the tendency of the cam to move one end of the shoe inward and the other end outward. It was difficult in the former brake constructions to overcome these difficulties by the application of lubricant because of the danger of the lubricant getting upon the brake lining and further decreasing the efficiency of the brakes. The efficiency of former brake constructions was affected also by the fact that it was necessary to mount the shaft carrying the cam upon a single relatively short bearing thereby permitting the shaft to shift and create unnecessary friction between the cam and brake shoe.

It is an object of the present invention to minimize these difficulties and provide a brake construction in which it is possible to force the brake shoe into engagement with the drum under a substantially uniform pressure throughout all possible points of engagement and as a result requiring a greatly reduced actuating pressure.

It is a further object of the invention to distribute force for applying the brake to different parts of the shoe and thus assure a substantially uniform pressure between all possible points of contact of the shoe and drum and this is accomplished preferably by a self-actuating mechanism responsive to the brake application force.

It is a further object of the invention to provide a brake construction in which the action of the cam is transmitted to the opposite ends of the brake shoe in substantially the same plane thereby providing equal moments of force and further assuring the application of uniform pressure.

It is a further object of the invention to provide a construction in which wear of the cam and parts engaging therewith is minimized and in which a compensating adjustment is provided for the wear of the brake lining and the brake drum.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawings, in which Fig. 1 is a sectional view taken on the line 1—1 of Fig. 2.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 1.

Fig. 5 is a detail view of the brake shoe.

Fig. 6 is a view similar to Fig. 1 showing the relation of the parts when the brake is applied.

Fig. 7 is a view similar to Fig. 1 but showing a brake embodying a modified form of the invention.

The brake construction illustrated in Figs. 1 to 5 inclusive comprises a drum 10 which is secured to the vehicle wheel 11 as by bolts 12. A backing plate 15 enclosing the end of the drum is suitably secured to the axle housing 16, as by bolts 17. An anchor pin 18 is fixed in a bracket 19 which is adjustably mounted upon the plate 15, as by bolts 20 passing through slots 21 in the bracket 19 and secured to the plate 15. If desired, the anchor pin 18 may project inwardly into a slot 22 in the backing plate 15.

As shown in Figs. 1, 2, and 6 a bell crank lever 23 is pivotally mounted upon the anchor pin 18 with one arm 25 thereof extending outwardly from the anchor pin or in a general direction away from the axis of the drum and beyond the anchor pin, this arm terminating in a ball 26 providing a curved surface adapted to engage an annular socket 27 formed in a bracket 28 secured as by rivets 29 to the brake shoe 30. This bracket is in the nature of a flexible plate at the inside of the brake shoe centrally between its ends and it provides for the flexibility of the central portion of the brake shoe. Arms 31 and 32 are provided on the bell crank with their free ends adapted for engagement with the bracket 28 which distributes the pressure exerted by the arms over the brake shoe. Rods 35 are secured to the bracket 28 and project radially inwardly through openings 36 in the ends of the arms 31 and 32. A spring 37 surrounds each rod with one end of each engaging the end of one of the arms of the lever 23 and their other ends each engaging a washer 38, the position of which is controlled by a pin 39 in each rod.

The brake shoe 30, preferably, is provided with inwardly extending flanges 40 at opposite edges thereof, the height of which decreases progressively from the central portion of the shoe towards its opposite ends thereby rendering the shoe decreasingly flexible from its opposite ends inward. A brake lining 44 or other similar material is secured in the usual manner to the shoe 30. The flexibility of the opposite end portions 41 and 42 of the brake shoe may be further increased by providing notches 43 in the flanges 40. In accordance with the preferred construction the end portions 41 and 42 are formed eccentric with the main portion of the brake shoe so as normally to provide a greater clearance between those portions and the drum than is provided between the drum and the remaining part of the shoe thereby permitting the opposite ends of the shoe to be brought closer together and permitting the brake lining 44 for the shoe, which is secured in any suitable manner thereon to have substantially continuous engagement throughout the peripheral surface of the drum 10. The degree of eccentricity of the end portions 41 and 42 is indicated by their relation to the dotted arc in Fig. 4 which is concentric with the main portion of the shoe.

A rod 45 is suitably secured to the brake shoe 30 at intermediate points thereon and extending radially inward therefrom through an opening 46 in a stop 47 adjustably mounted on the backing plate 15 by bolts 48 passing through slots 49 in the stop 47 and secured to the backing plate (see Fig. 4). A spring 50 surrounds each rod 45 with one end of each engaging one of the stops 47 and the other end of each engaging a cup shaped stop 51 held upon each rod 45 by a pin 52.

A bracket 60 is secured as by rivets 61 to each of the end portions 41 and 42 of the brake shoe 30 and each is provided with an adjustable stop or screw 62 locked in position upon the bracket by a lock nut 63. Preferably, the heads of the screws 62 are hardened to increase their resistance to wear.

In order to minimize wear, the actuating cam 71 is enclosed in a grease tight housing which may comprise a cup-shaped member 65 and a cover 66 both of which are secured upon the backing plate 15 (Fig. 3) as by bolts 67. The cover 66 is provided with a central opening forming a bearing 68 for the cam shaft 69 projecting through the backing plate 15. The free end of the shaft 69 is supported in an outboard bearing 70 formed in the member 65. The cam 71 is formed on the shaft 69 intermediate the bearings 68 and 70 and is adapted for engagement on opposite sides thereof with the heads of alined plungers 72 projecting through openings 73 in the housing member 65. The free ends of the plungers 72 are adapted for engagement respectively with the stops 62 adjustably mounted upon the brackets 60 on the opposite end portions 41 and 42 of the brake shoe.

Proper clearance between the brake lining 44 and the drum 10 may be provided by properly adjusting the stops 62 and the bracket 19 supporting the anchor pin 18 upon the backing plate. The springs 37 assist in retracting the brake shoe and normally maintain engagement between the free ends of the bell crank lever arms 31 and 32 and the brake shoe or bracket 28 thereon. The retraction of the shoe is further assisted by the springs 50.

When the brakes are applied to turn the cam 71 as shown in Fig. 6, the plungers 72 are moved in the same plane in opposite directions to engage the stops 62 and move the opposite end portions 41 and 42 outwardly into engagement with the drum and at the same time expand the shoe 30 as a whole against the drum. As soon as contact between the shoe and drum is effected the rotation of the drum tends to rotate the brake shoe 30 in the direction of rotation of the drum as shown by the arrow in Fig. 6, but this action is counteracted by the arm 25 of the bell crank which tends to move slightly as a result thereof and press the arm 32 outwardly or in a general direction away from the axis of the drum and thus distribute the force or pressure of the cam to press the shoe against the drum with a substantially uniform pressure through all possible points of contact. If the vehicle or drum 10 is moving in the opposite direction when the brakes are applied the brake shoe will tend to rotate with the drum in the opposite direction from that indicated by the arrow in Fig. 6 and cause the arm 31 of the bell crank to exert a pressure tending to force the shoe 30 against the drum 10. The pressure of the arms 31 and 32 upon the shoe may be varied by shortening or lengthening the arm 25 or the arms 31 and 32 of the bell crank 23.

In the modification of the invention illustrated in Fig. 7 a plurality of brackets 96 are secured to the brake shoe 30 as by rivets 97. Each bracket 96 is provided with an inwardly projecting lug or stop 98 having a plane face 99. An anchor pin 100 is suitably mounted in the backing plate 15 adjacent each lug 98. A bell crank 101 is pivotally mounted upon each pin 100 with one arm in engagement with the face 99 of the lug 98 and the other arm 102 engaging the bracket 96 secured upon the shoe 30. Preferably, the arm 102 is provided with an adjustable stop or screw 103 which is locked in adjusted position thereon as by a lock-nut 104. In addition to the springs 50, the shoe 30 is retracted by a spring 105 one end of which is secured to a pin 106 extending between the flanges 40 on the brake shoe and the other end is secured to a pin 107 upon the backing plate 15.

In this form of brake, adjustment for wear of the cam 71 and its associated parts as well as for wear of the brake lining 44 is effected by the adjustable stops 62 as in the previously described form and by the adjustable stops 103. It will be noted that the spring 105 maintains engagement between the bracket 96 and the adjustable stop 103 and also maintains the plane face 99 on the lug 98 in engagement with the other arm of the bell crank 101, the plane face 99 permitting adjustment of the shoe inwardly or outwardly.

The invention provides a brake in which the brake shoe is pressed against the drum under a substantially uniform pressure and in which the efficiency of the brake is increased over 50 per cent, thus making possible a material reduction in force or pressure which must be applied to operate the brake. The wear of the lining is substantially uniform thus materially increasing its life. The construction is such that the moments of the forces applied to opposite ends of the brake are equal and these forces are distributed at a plurality of points upon the brake shoe by a self energizing mechanism so as to wrap the shoe against the drum and thus assure contact between the shoe and drum at all possible points. The flexibility and eccentricity of the end portions of the shoe make it possible to adjust the shoe very close to the drum and yet provide proper clearance between the end portions of the shoe and the drum. As a result it is possible to extend the brake lining to bring the opposite ends thereof close together and provide a greater area of contact between the shoe and drum. The means for retracting the brake shoe is so constructed and arranged that the springs 37 and 50 are maintained at all times under the same degree of compression regardless of the adjustment of the brake shoe relative to the drum, thus assuring the desired braking action with a minimum application of force upon the operating cam.

What I claim is:

1. In a brake, in combination, a drum, a shoe adapted for engagement with said drum, a backing plate, means for applying a force to one end of said shoe to bring the shoe in engagement with the drum, means responsive to the action of said force to press said shoe uniformly against said drum including a lever pivotally mounted on said plate with one end adapted to engage said shoe at a point intermediate the ends of the shoe, and a universal connection between the other end of the lever and the shoe.

2. In a vehicle brake, in combination, a drum, a shoe adapted for engagement with said drum, a backing plate, a three arm bell crank lever pivoted to said plate, two of said arms acting at opposite sides of the pivot to press the shoe against the drum, and the third arm having substantially a universal joint connection with said shoe at a point between said pivot and shoe.

3. In a brake, the combination of a rotatable drum, a brake shoe adapted to engage the drum, a fixed member, a rocking lever pivoted to said member and having oppositely extending arms adapted to press the shoe against the drum at circumferentially spaced points, and a ball and socket connection between said lever and shoe at a point intermediate said pivot and shoe.

4. The combination of a brake drum, a flexible brake band within said drum having spaced ends, pressure distributing means at the inside of said band centrally between said ends and providing for the flexibility of the central portion of said band, means for spreading said ends apart, an anchor pin within said band, and a rockable member upon said anchor pin having a part extending outwardly toward said band for actuation by the latter, said rockable member also having transversely extending parts engaging said pressure distributing means on opposite sides of said anchor pin and adapted to alternatively exert outward force on said band upon actuation of said spreading means.

5. In a vehicle brake, in combination, a brake drum, a transversely split brake band adapted for engagement with said drum, said band having end portions and being flexible throughout its length between said end portions, means for applying force to said end portions to bring said band into engagement with said drum, an anchor pin within said band and a rockable member upon said anchor pin having a part extending outwardly therefrom towards said band for actuation by the latter and also having a transversely extending part adapted to exert outward force on said band at a point between said end portions upon actuation of said means for applying force to said end portions.

6. In a vehicle brake, in combination, a brake drum, a transversely split brake band adapted for engagement with said drum, said band having end portions and being flexible throughout its length between said end portions, means for applying force to said end portions to bring said band into engagement with said drum, an anchor pin, and a rockable member upon said anchor pin having an arm acting upon said band at a point intermediate said end portions to press the same outwardly against said drum, said member having a second arm actuated by said band at a point in the direction of rotation of said drum beyond the point of action of said first mentioned arm to rock said member and cause said first mentioned arm to press said band outwardly.

7. The combination of a brake drum, a transversely split flexible brake band adapted to engage said drum, a fixed member, an anchor pin upon said fixed member, and a rockable member upon said anchor pin and having oppositely extending arms adapted to press against said drum the portion of said band between its ends, said portion being flexible, said rockable member also having an intermediate arm extending outwardly from said anchor pin adapted to be actuated by said band upon circumferential movement of the latter.

8. The combination of a brake drum, a transversely split brake band adapted for engagement with said drum, said band having end portions and being flexible throughout its length between said end portions, pressure distributing means at the inside of said band centrally between said ends and providing for the flexibility of said band between said end portions, means for applying force to said end portions to bring said band into engagement with said drum, an anchor pin, and a rockable member upon said anchor pin having an arm acting upon said pressure distributing means to press the band outwardly against said drum, said member having a second arm actuated by said band at a point substantially diametrically opposite the split in said band and in the direction of rotation of said drum beyond the point of action of said first mentioned arm to rock said member and cause said first mentioned arm to press said band outwardly.

9. In a vehicle brake, in combination, a brake drum, a transversely split brake band adapted for engagement with said drum, said band having end portions and being flexible throughout its length between said end portions, means for applying force to said end portions to bring said band into engagement with said drum, an anchor member, and a member rockable upon said anchor member having a part extending outwardly from said anchor member toward said band for actuation by the latter and also having a transversely extending part adapted to exert outward force on said band at a point between said end portions upon actuation of said means for applying force to said end portions.

10. The combination of a brake drum, a transversely split flexible brake band adapted to engage said drum, a stationary member and a member rockable upon said stationary member and having spaced parts adapted to press against said drum the portion of said band between its ends, said portion being flexible, said rockable member also having a part intermediate said spaced parts and extending outwardly from said stationary member and adapted to be actuated by said band upon circumferential movement of the latter.

11. In a vehicle brake, in combination, a brake drum, a transversely split brake band adapted for engagement with said drum, said band having end portions and being flexible throughout its length between its end portions, means for applying force to said end portions to bring said band into engagement with said drum, a stationary member and a member rockable upon said stationary member having a part acting upon said band at a point intermediate said end portions to press the same outwardly against said drum, and means for actuating said rockable member from said band at a point in the direction of rotation of said drum beyond the point of action of said part to rock said rockable member and cause said part to press said band outwardly.

12. In a vehicle brake, in combination, a brake drum, a transversely split brake band adapted for engagement with said drum, said band having end portions and being flexible throughout its length between said end portions, means for applying force to said end portions to cause said band to engage said drum, means for applying outward pressure upon said band at a point intermediate said end portions to press said band outwardly against said drum, and actuating means for said pressure applying means, said actuating means being operatively connected to said band intermediate said end portions and in the direction of rotation of said drum beyond the point of action of said pressure applying means upon said band.

GEORGE JOSEPH THOMAS.